(12) United States Patent
Liao

(10) Patent No.: US 6,915,726 B2
(45) Date of Patent: Jul. 12, 2005

(54) WOOD-TURNING LATHE

(76) Inventor: Juei-Seng Liao, No. 195, Sec. 1, Nanking E. Rd., Taichung City (TW)

( * ) Notice: Subject to any disclaimer, the term of this patent is extended or adjusted under 35 U.S.C. 154(b) by 126 days.

(21) Appl. No.: 10/645,415

(22) Filed: Aug. 20, 2003

(65) Prior Publication Data

US 2004/0035267 A1 Feb. 26, 2004

Related U.S. Application Data

(63) Continuation-in-part of application No. 09/882,350, filed on Jun. 15, 2001, now abandoned.

(30) Foreign Application Priority Data

May 1, 2001 (TW) ...................................... 90207042 U

(51) Int. Cl.$^7$ .............................................. B23B 19/00
(52) U.S. Cl. ............................. 82/143; 82/144; 82/142; 82/905
(58) Field of Search ........................ 82/142, 143, 144, 82/145, 115, 117, 133; 74/337

(56) References Cited

U.S. PATENT DOCUMENTS

| | | | |
|---|---|---|---|
| 3,418,863 A | * | 12/1968 | Landau ........................ 474/40 |
| 3,718,405 A | * | 2/1973 | Keiter et al. ................. 408/128 |
| 4,497,353 A | * | 2/1985 | Sproat, Jr. .................... 144/1.1 |
| 4,573,380 A | * | 3/1986 | Bald ........................... 82/142 |
| 5,186,088 A | | 2/1993 | Wixey |

\* cited by examiner

Primary Examiner—Willmon Fridie, Jr.
(74) Attorney, Agent, or Firm—Christie, Parker & Hale, LLP

(57) ABSTRACT

A wood-turning lathe includes a spindle and a drive shaft journalled to a headstock housing. A motor is mounted in the headstock housing, and includes a rotor. A torque converter includes a first wheel that co-axially surrounds the spindle and that is securely coupled to the rotor, a second wheel mounted securely on the drive shaft, and a belt trained on the first and second wheels, thereby increasing torque of the drive shaft. A speed change device includes a first pulley unit mounted on the drive shaft and defining a first belt-engaging surface, a second pulley unit mounted on the spindle and defining a second belt-engaging surface, and a non-elastic belt interconnecting the first and second pulley units and frictionally contacting the first and second belt-engaging surfaces.

3 Claims, 10 Drawing Sheets

US 6,915,726 B2

WOOD-TURNING LATHE

CROSS-REFERENCE TO RELATED APPLICATION

This application is a Continuation-in-Part of U.S. patent application Ser. No. 09/882,350, filed on Jun. 15, 2001 abandoned, which claims priority of Taiwanese Patent Application No. 090207042, filed on May 1, 2001.

BACKGROUND OF THE INVENTION

1. Field of the Invention

The invention relates to a wood-turning lathe, more particularly to a wood-turning latch with a torque converter for increasing the torque of a drive shaft.

2. Description of the Related Art

U.S. Pat. No. 5,186,088 discloses a variable speed lathe that includes a lathe bed and a headstock mounted on the lathe bed. The headstock includes a driving shaft driven by a motor, and a driven shaft connected to the driving shaft through a speed adjusting unit that includes speed variable driving and driven pulleys such that the speed ratio of the driven shaft to the driving shaft can be adjusted through the speed adjusting unit.

The conventional variable speed lathe is disadvantageous in that since the driving shaft is connected directly to the motor, the adjustable range of the aforesaid speed ratio is relatively narrow. A larger motor is normally required for increasing the aforesaid speed ratio. However, a larger space is required for accommodating a larger motor in the headstock, which results in a considerable increase in the size of the headstock.

SUMMARY OF THE INVENTION

Therefore, the object of this invention is to provide a wood-turning lathe which includes a torque converter for increasing the torque of a drive shaft.

Accordingly, a wood-turning lathe of the present invention includes; a bed; a headstock housing mounted on the bed; a motor unit mounted in the headstock housing, and including a rotor; a spindle journalled to the headstock housing, extending co-axially through the rotor, and having an output end extending outwardly from the headstock housing; a drive shaft journalled to the headstock housing, parallel to the spindle, and having an outer coupling end that extends outwardly from the headstock housing and an inner coupling end that is opposite to the outer coupling end and that is disposed within the headstock housing; a torque converter including a first wheel that co-axially surrounds the spindle and that is securely and co-axially coupled to the rotor so as to co-rotate with the rotor, a second wheel mounted securely and co-axially on the inner coupling end of the drive shaft, and a transmission belt trained on the first and second wheels, the first wheel having a diameter less than that of the second wheel so that a torque ratio of the drive shaft to the rotor is greater than one; and a speed change device including a first pulley unit, a second pulley unit, and a non-elastic belt. The first pulley unit is mounted on the outer coupling end of the drive shaft, and includes a first fixed pulley and a first movable pulley which cooperatively define therebetween a radially and outwardly diverging first belt-engaging surface. The second pulley unit is mounted on the output end of the spindle, and includes a second fixed pulley and a second movable pulley which cooperatively define therebetween a radially and outwardly diverging second belt-engaging surface. The non-elastic belt is trained on and is in frictional contact with the first and second belt-engaging surfaces so as to permit power transmission from the drive shaft to the spindle.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
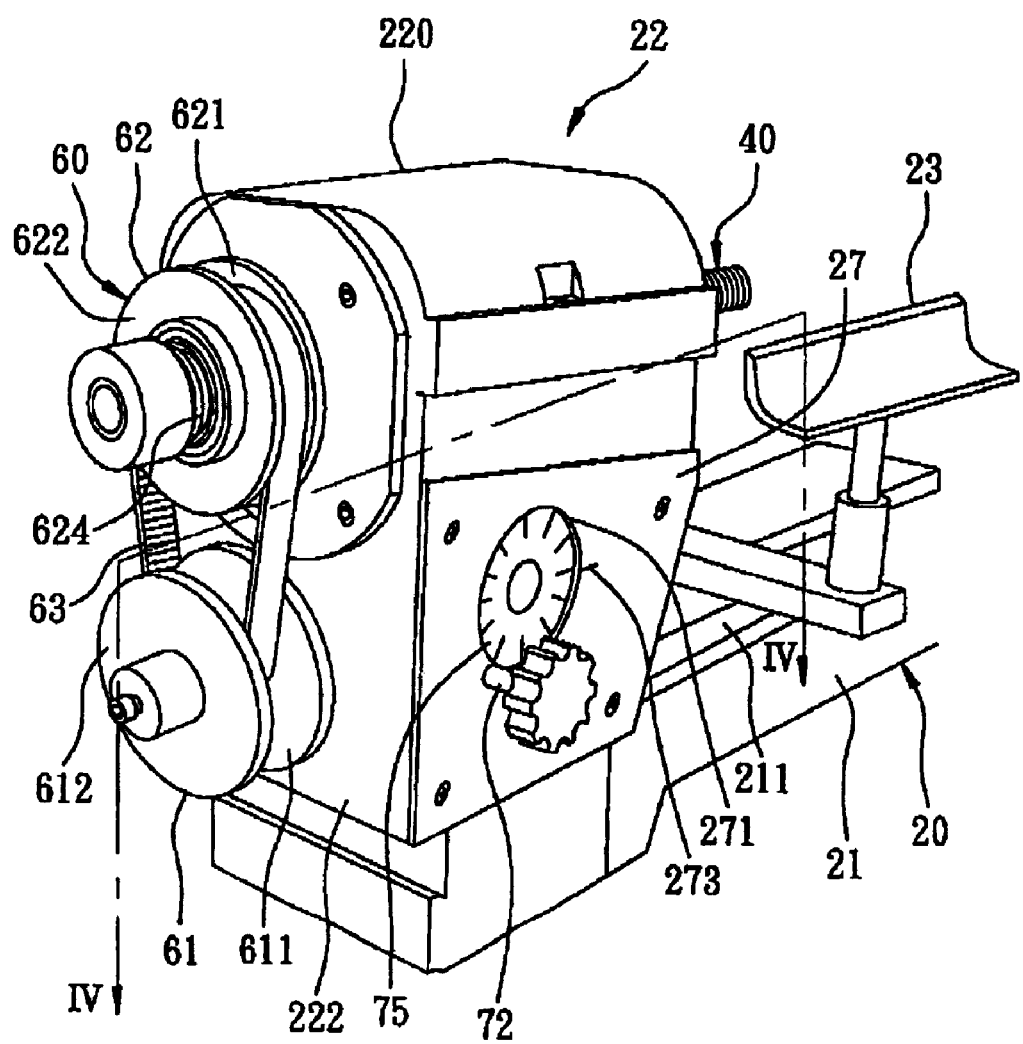
FIG. 1 is a fragmentary perspective view of the preferred embodiment of a wood-turning lathe according to the present invention.

Referring to FIGS. 1 to 4, the preferred embodiment of a wood-turning lathe 20 according to the present invention is shown to include a lathe bed 21, a headstock 22 mounted on the bed 21, a tail-stock (not shown) mounted on the bed 21, a tool rest 23 mounted on the bed 21 between the headstock 22 and the tail-stock, a motor unit 30, a spindle 40, a drive shaft 50, a torque converter, and a speed change device 60.

As illustrated, the headstock 22 includes a headstock housing 220 that has a flat bottom 221 mounted on the upper surface 211 of the lathe bed 21, and opposite left and right side walls 222, 223 which extend upwardly from the flat bottom 221.

The spindle 40 is journalled between the side walls 222, 223 of the headstock housing 220 by means of two bearing units 24,25, and has an output end 43 that extends outwardly from the headstock housing 220.

The drive shaft 50 is journalled to the headstock housing 220 by means of two bearing units (613, 226), and is parallel to the spindle 40. The drive shaft 50 has an outer coupling end 53 that extends outwardly from the headstock housing 220, and an inner coupling end 52 that is opposite to the outer coupling end 53 and that is disposed within the headstock housing 220.

The motor unit 30 is disposed on a motor support 225 (see FIG. 3) within the headstock housing 220, and includes a stator 31 and a rotor 32.

The torque converter includes a hollow coupler shaft 34, a first wheel 341, a second wheel 521, and a transmission belt 54. The coupler shaft 34 is co-axially and securely connected to the rotor 32 for co-rotation therewith, and surrounds co-axially the spindle 40. The first wheel 341 is integrally formed on the coupler shaft 34. The second wheel 521 is mounted securely and co-axially on the inner coupling end 52 of the drive shaft 50. The transmission belt 54 is trained on the first and second wheels 341,521 to transmit rotation of the rotor 32 to the drive shaft 50. The first wheel 341 has a diameter less than that of the second wheel 521 so that a torque ratio of the drive shaft 50 to the rotor 32 is greater than one.

The speed change device 60 includes a first pulley unit 61, a control unit 70, a second pulley unit 62, and a non-elastic belt 63. The first pulley unit 61 is mounted on the outer coupling end 53 of the drive shaft 50, and includes a first fixed pulley 612 and a first movable pulley 611. The first fixed and movable pulleys 612,611 cooperatively define therebetween a first belt receiving space and form a radially and outwardly diverging first belt-engaging surface (6111, 6121) that confines the first belt receiving space. The control unit 70 is mounted on the headstock housing 220, and has an operable knob 72 exposed from the headstock housing 220. The operable knob 72 is operably associated with the first movable pulley 611. The second pulley unit 62 is mounted on the output end 43 of the spindle 40, and includes a second fixed pulley 621 and a second movable pulley 622 which cooperatively define therebetween a second belt receiving space and which form a radially and outwardly diverging second belt-engaging surface (6211, 6212) that confines the second belt receiving space. The second pulley unit 62 further includes an urging member 624, in the form of a coil spring, for urging the second movable pulley 622 toward the second fixed pulley 621. The non-elastic belt 63 interconnects the first and second pulley units 61,62 in such a manner that the belt 63 is frictionally slidable along the first and second belt-engaging surfaces (6111,6121), (6211, 6212) and cooperates with the drive shaft 50 to define a first radial distance (L1) therebetween, and with the spindle 40 to define a second radial distance (L2) therebetween. Under this condition, operation of the operable knob 72 results in axial movement of the first movable pulley 611 along the drive shaft 50 toward and away from the first fixed pulley 612 and consequently results in movements of the non-elastic belt 63 along the first and second belt-engaging surfaces (6111, 6121), (6211,6212) within the first and second belt receiving spaces, thereby varying the first and second radial distances (L1, L2).

In the preferred embodiment, the operable knob 72 has a first threaded end 721. The control unit 70 further includes a C-shaped bearing seat 26 fixed in a mounting hole 2221 in the left side wall 222 of the headstock housing 220 so as to be disposed around the drive shaft 50 between the first movable pulley 611 and the operable knob 72. The bearing seat 26 has two spaced apart two ends 264. A crank element 71 is pivoted to the ends 264 of the bearing seat 26 by a pivot pin 73 so as to be turnable relative to the ends 264. The crank element 71 has a second threaded end 711 threadedly engaging the first threaded end 721 of the operable knob 72, and a U-shaped push end 714 which abuts against the first movable pulley 611 so that operation of the operable knob 72 results in swinging action of the U-shaped push end 714 relative to the bearing seat 26, which in turn, results in movement of the first movable pulley 611 toward and away from the first fixed pulley 612.

Figure 2:
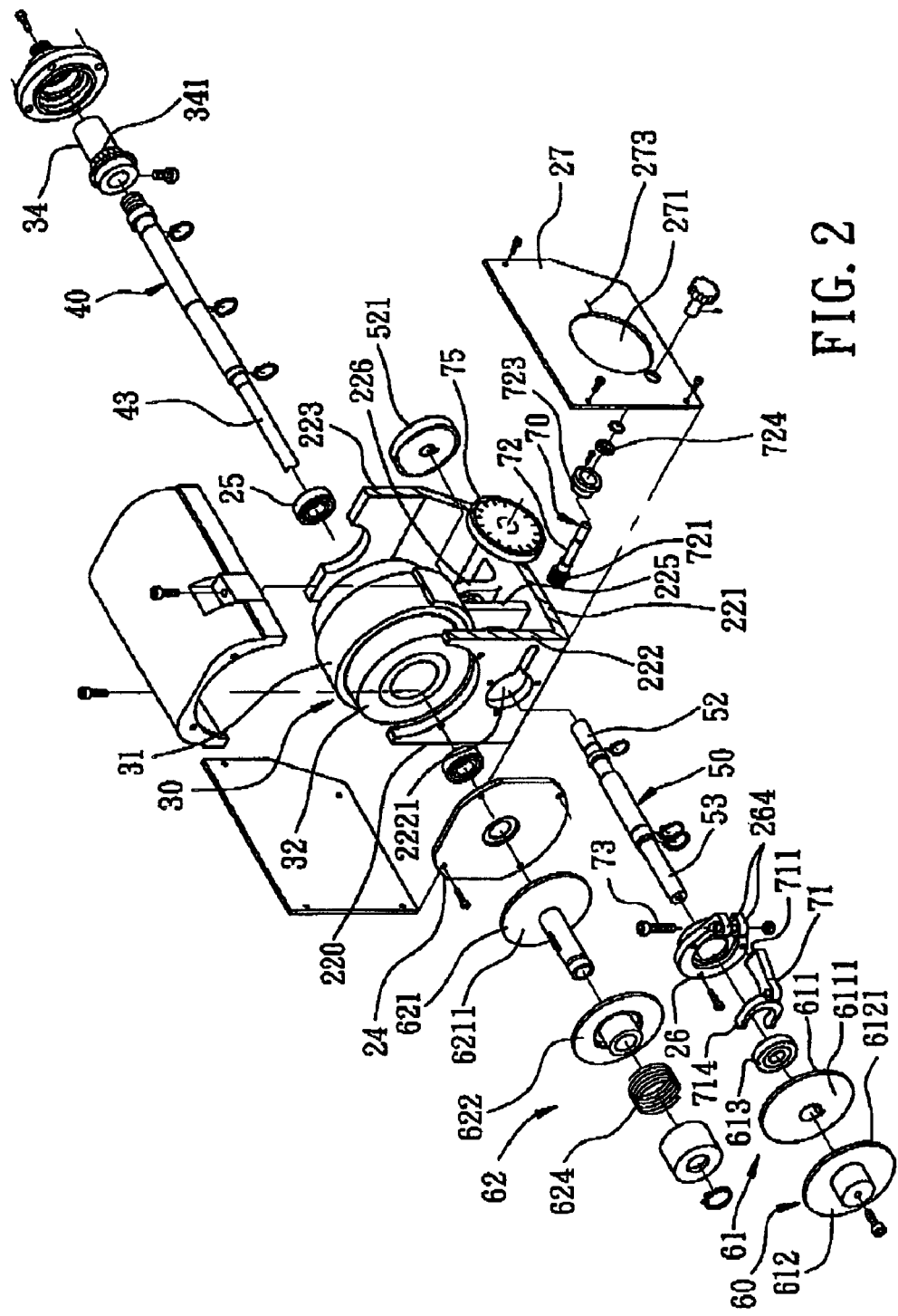
FIG. 2 is a partly exploded perspective view of the preferred embodiment.
Figure 4:
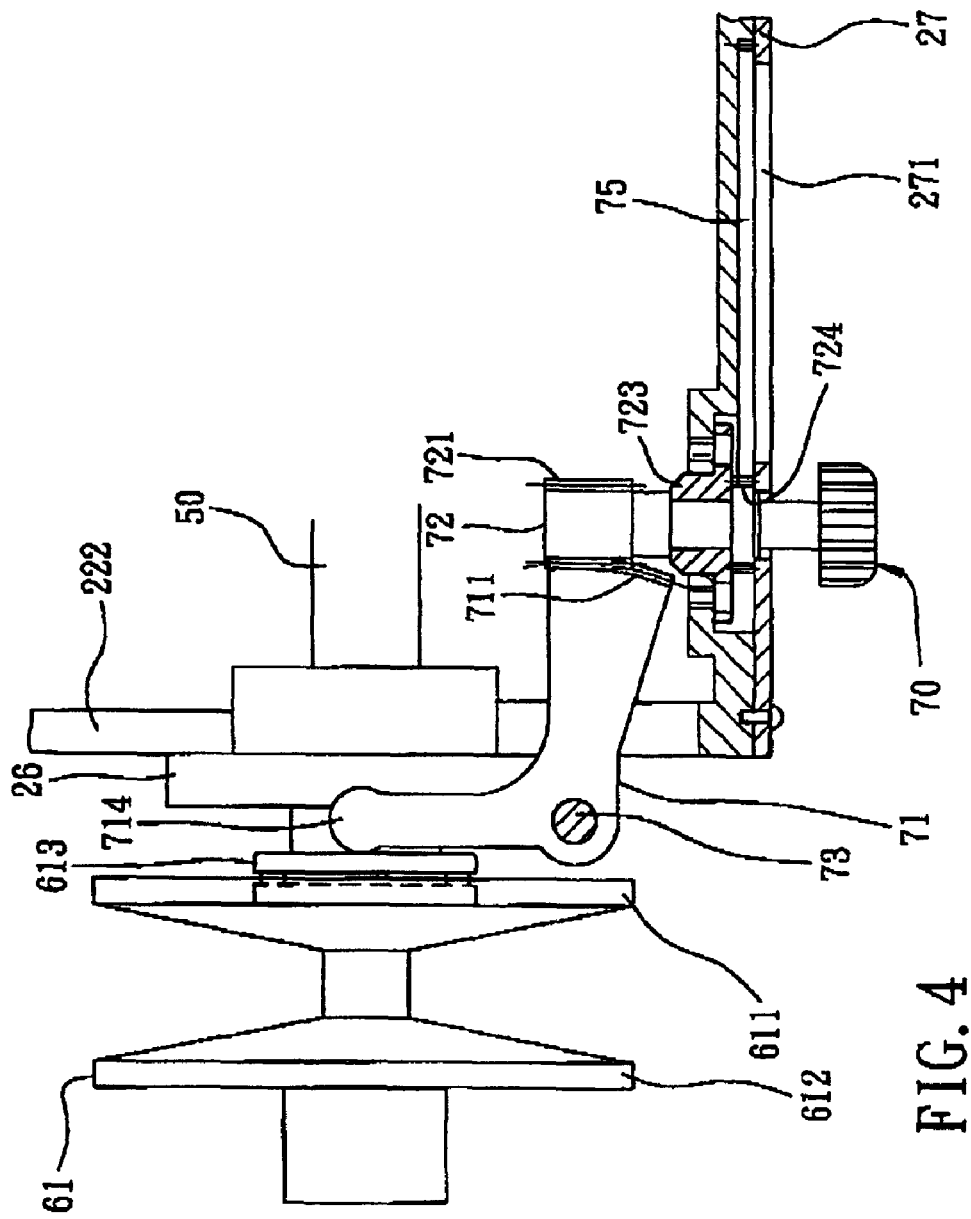
FIG. 4 is a fragmentary partly sectional schematic top view of the preferred embodiment taken along lines IV—IV in FIG. 1, illustrating a torque converter and a control unit employed therein.
Figure 5:
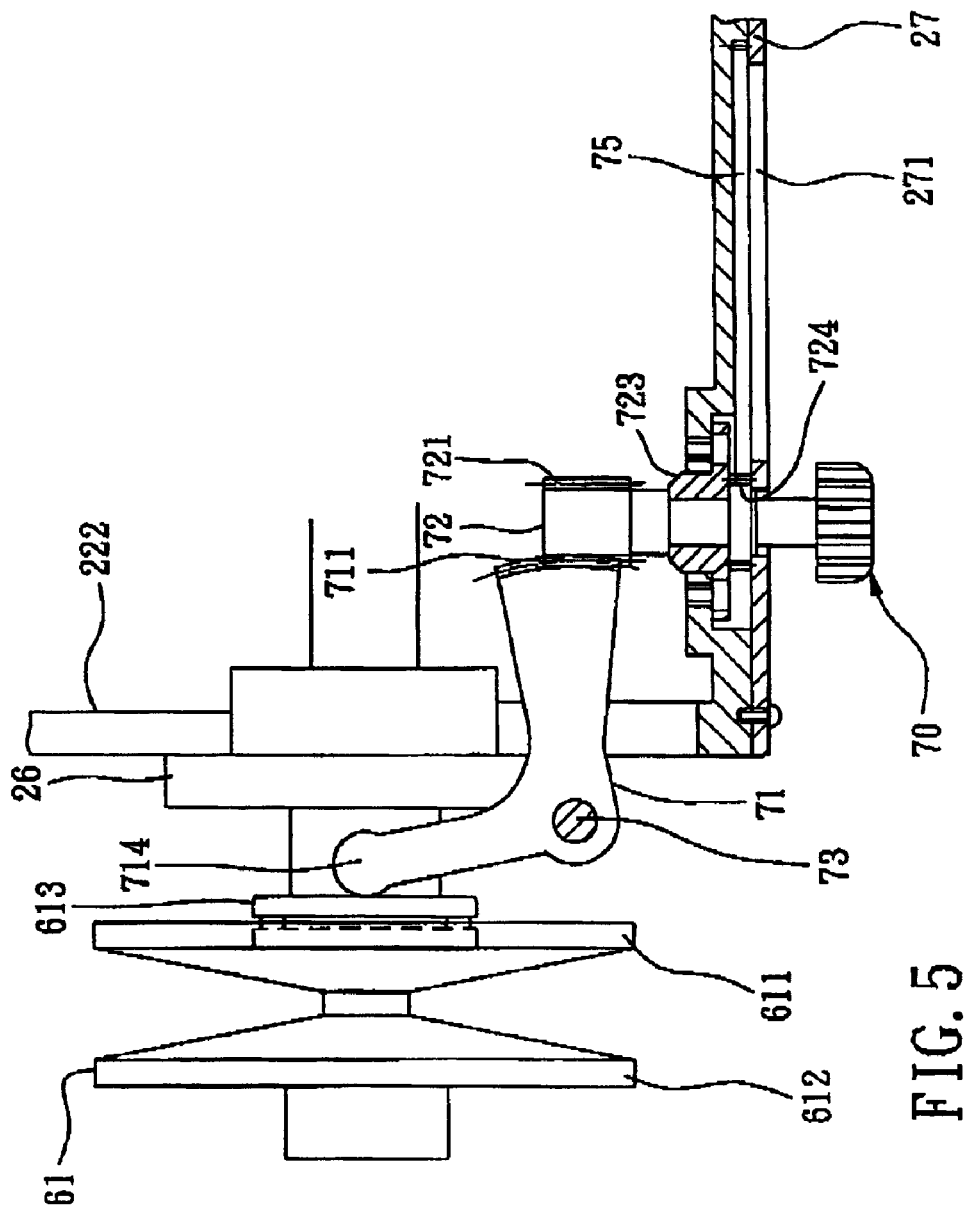
FIG. 5 is a view similar to FIG. 4, illustrating how the control unit is activated to move a movable pulley relative to a fixed pulley.

Referring to FIGS. 2, 4 and 5, the headstock housing 220 has a front wall 27 formed with a dial opening 271. A bushing 723 is fixed on the wall 27. A dial 75 is mounted rotatably on the wall 27, is exposed from the dial opening 271, and is operably connected to the operable knob 72 via the bushing 723 and a toothed wheel 724 such that the dial 75 cooperates with an indicating mark 273 on the wall 27 to indicate the speed of the spindle 40 upon rotation of the operable knob 72.

Figure 3:
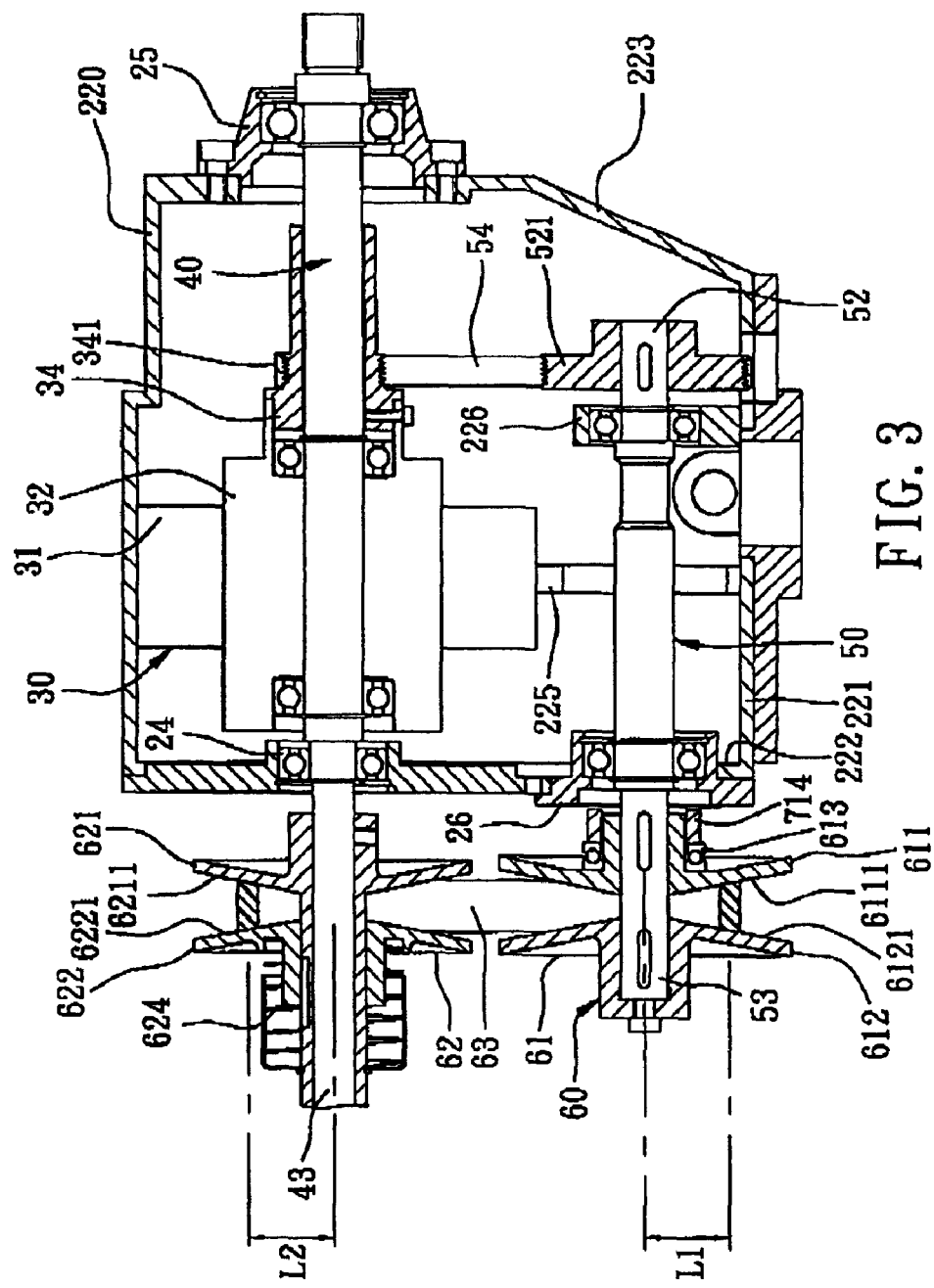
FIG. 3 is a fragmentary sectional view of the preferred embodiment.
Figure 6:
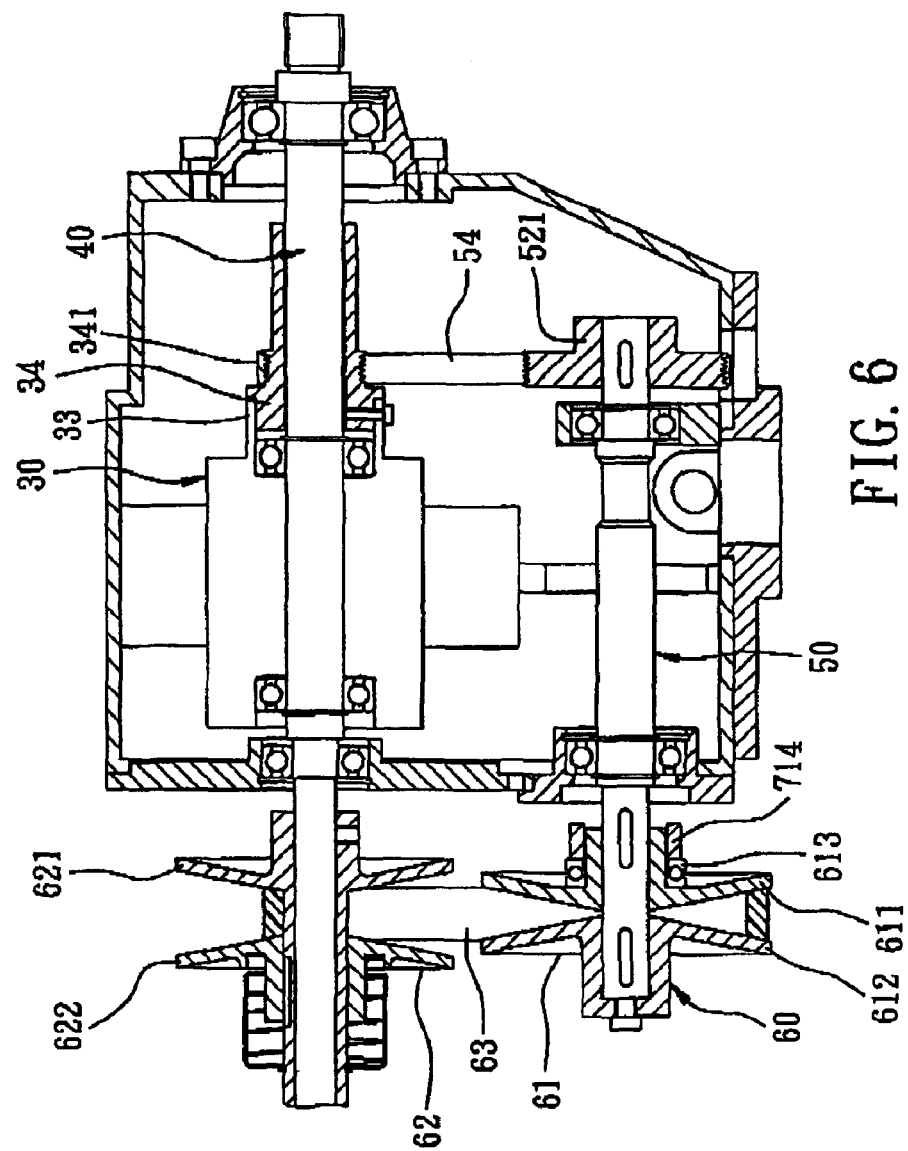
FIG. 6 is a fragmentary sectional view of the preferred embodiment, illustrating a first condition where an output end of a spindle is rotated at a high speed.

Referring to FIGS. 3 and 6, when it is desired to increase the rotation speed of the spindle 40, the operable knob 72 can be turned in a first direction so as to rotate the crank element 71 and move the first movable pulley 611 on the drive shaft 50 toward the first fixed pulley 612. Under this condition, the belt 63 is moved downwardly along the first and second belt-engaging surfaces (6111,6121), (6211, 6212), which results in an increase in the first radial distance (L1) and a decrease in the second radial distance (L2). As a consequence, the pulley units 61,62 act like a large gear that drives a small gear, thereby permitting the spindle 40 to have a higher speed than that of the drive shaft 50.

Figure 7:
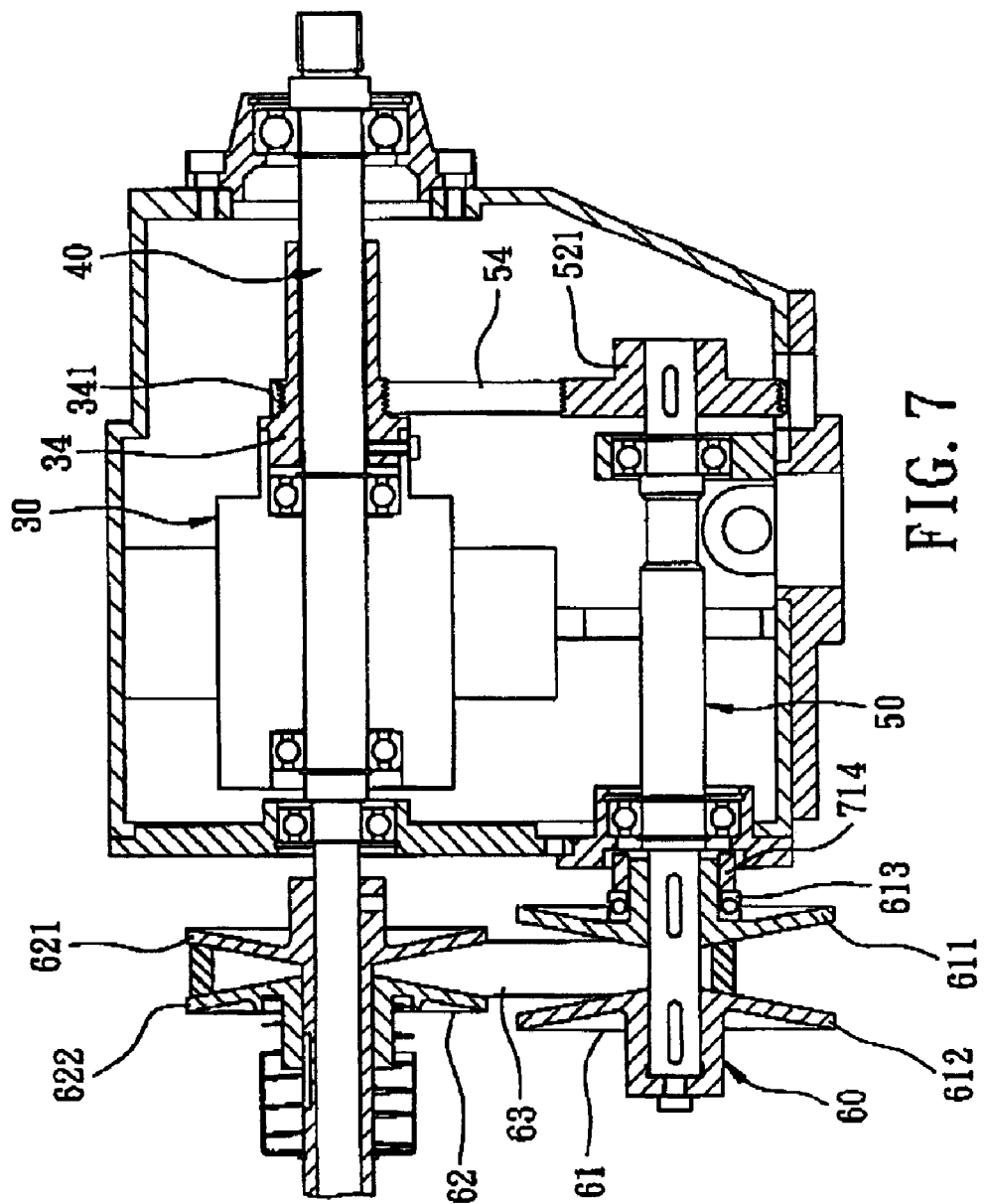
FIG. 7 is a fragmentary sectional view of the preferred embodiment, illustrating a second condition where the output end of the spindle is rotated at a slow speed.

Referring to FIGS. 3 and 7, when it is desired to decrease the rotation speed of the spindle 40, the operable knob 72 can be turned in a second direction opposite to the first direction so as to move the first movable pulley 611 on the drive shaft 50 away from the first fixed pulley 612. Under this condition, the belt 63 moves upwardly along the first and second belt-engaging surfaces (6111,6121), (6211, 6212), which results in a decrease in the first radial distance (L1) and an increase in the second radial distance (L2). As a consequence, the pulley units 61, 62 act like a small gear that drives a large gear, thereby permitting the spindle 40 to have a lower speed than that of the drive shaft 50.

Figure 8:
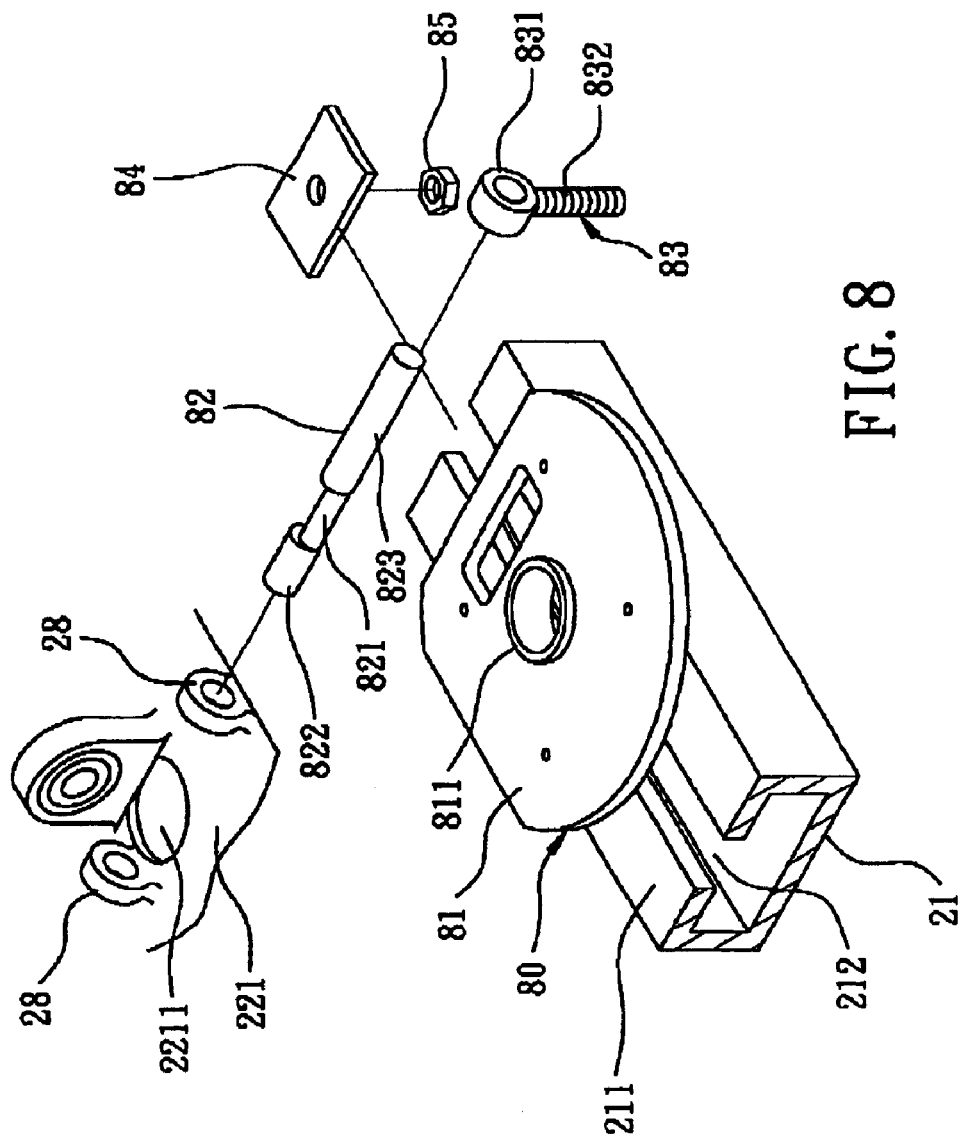
FIG. 8 is an exploded view of a locking device employed in the preferred embodiment for locking a headstock housing on a lathe bed.
Figure 9:
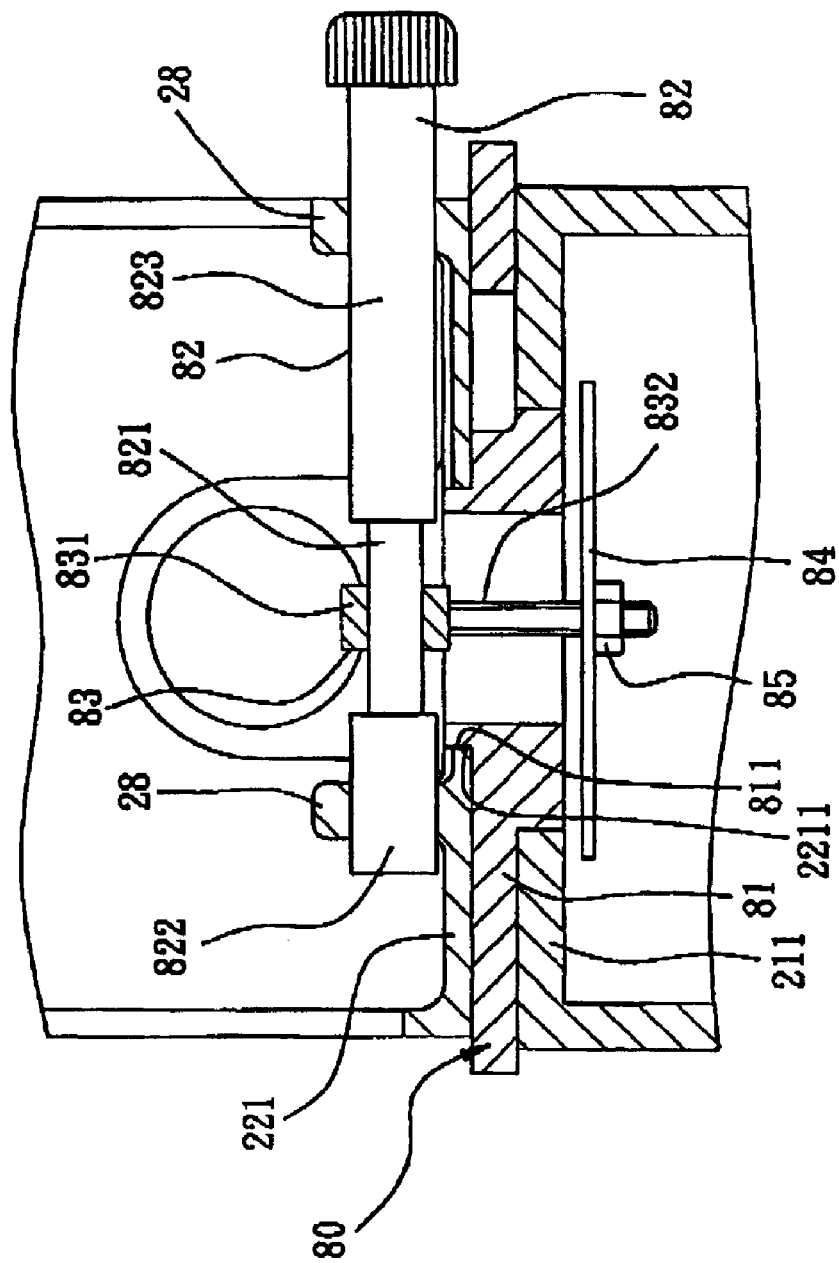
FIGS. 9 and 10 are fragmentary sectional views of the preferred embodiment, illustrating how the headstock housing is locked and unlocked on the lathe bed by means of the locking device shown in FIG. 8.
Figure 10:
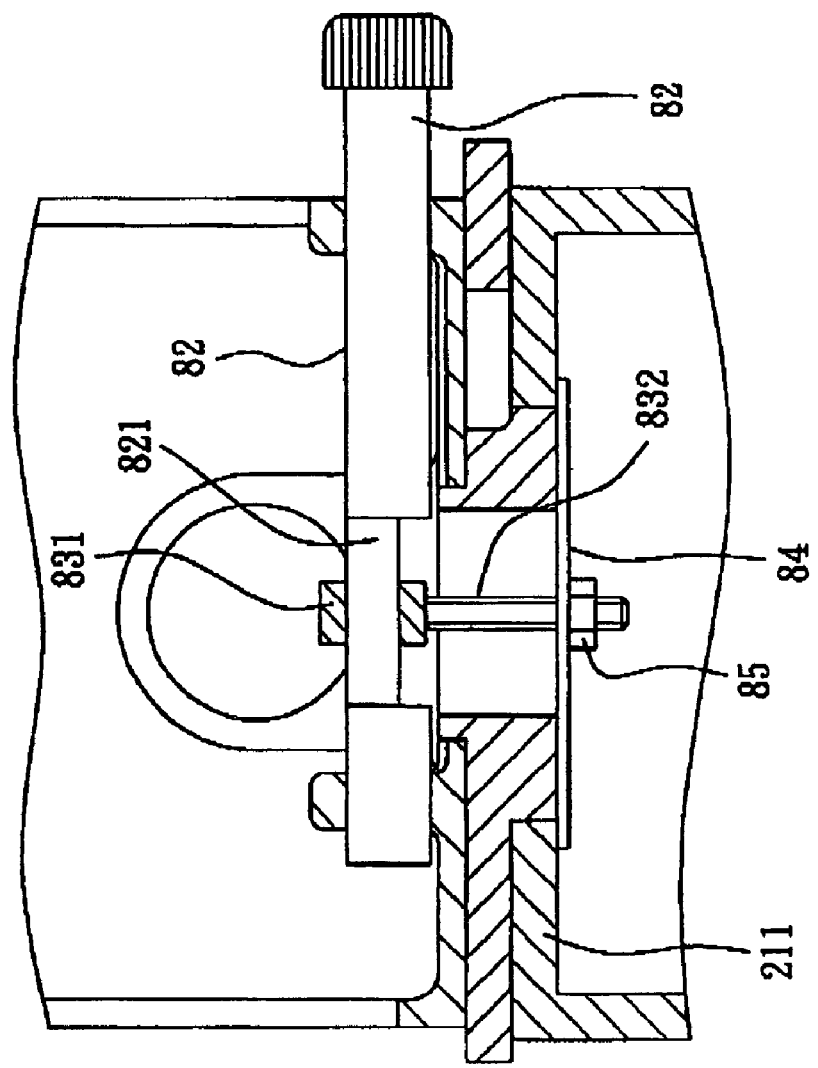

Referring to FIGS. 8, 9 and 10, a releasable locking device 80 is provided between the flat bottom 221 of the headstock housing 220 and the lathe bed 21. The locking device 80 includes a mounting disc 81 which is disposed over the lathe bed 21 and which is formed with an annular flange 811 that projects upwardly through a circular hole 2211 in the flat bottom 221 of the headstock housing 220, a regulating rod 82 which has opposite end sections 822,823 pivoted to two ears 28 that project upwardly from the flat bottom 221, and a middle section 821 disposed between and eccentric relative to the end sections 822,823, and a fastener unit 83. The fastener unit 83 includes a tubular sleeve 831 sleeved on the middle section 821, and a threaded shaft 832 which extends integrally from the sleeve 831 and through the flange 811 of the disc 81 into a groove 212 in the lathe bed 21, and which engages a tightening member that includes a nut 85 and a plate 84. Rotation of the regulating rod 82 in a first direction results in locking of the flat bottom 221 of the headstock housing 220 on the mounting disc 81. To release the headstock housing 220 from the disc 81, the regulating rod 82 can be turned in a second direction opposite to the first direction.

Since the torque of the drive shaft 50 can be increased by the torque converter of the wood-turning lathe of the present invention, the aforesaid drawbacks as encountered in the prior art can be eliminated.

With this invention thus explained, it is apparent that numerous modifications and variations can be made without departing from the scope and spirit of this invention. It is therefore intended that this invention be limited only as indicated in the appended claims.

I claim:

1. A wood-turning lathe comprising:
   a bed;
   a headstock housing mounted on said bed;

a motor unit mounted in said headstock housing, and including a rotor;

a spindle journalled to said headstock housing, extending co-axially through said rotor, and having an output end extending outwardly from said headstock housing;

a drive shaft journalled to said headstock housing, parallel to said spindle, and having an outer coupling end that extends outwardly from said headstock housing, and an inner coupling end that is opposite to said outer coupling end and that is disposed within said headstock housing;

a torque converter including a first wheel that co-axially surrounds said spindle and that is securely and co-axially coupled to said rotor so as to co-rotate with said rotor, a second wheel mounted securely and co-axially on said inner coupling end of said drive shaft, and a transmission belt trained on said first and second wheels, said first wheel having a diameter less than that of said second wheel so that a torque ratio of said drive shaft to said rotor is greater than one; and a speed change device including
    a first pulley unit mounted on said outer coupling end of said drive shaft, and including a first fixed pulley and a first movable pulley, said first fixed and movable pulleys cooperatively defining therebetween a radially and outwardly diverging first belt-engaging surface,
    a second pulley unit mounted on said output end of said spindle, and including a second fixed pulley and a second movable pulley which cooperatively define therebetween a radially and outwardly diverging second belt-engaging surface, and
    a non-elastic belt trained on and in frictional contact with said first and second belt-engaging surfaces so as to permit power transmission from said drive shaft to said spindle.

2. The wood-turning lathe as defined in claim 1, wherein said torque converter further includes a hollow coupler shaft that co-axially surrounds said spindle and that is co-axially and securely connected to said rotor for co-rotation therewith, said first wheel being integrally formed on said coupler shaft.

3. The wood-turning lathe as defined in claim 2, further comprising a control unit mounted on said headstock housing and including an operable knob exposed from said headstock housing and operably associated with said first movable pulley of said first pulley unit in such a manner that rotation of said operable knob results in axial movement of said first movable pulley along said drive shaft toward and away from said first fixed pulley and consequently results in movement of said non-elastic belt along said first and second belt-engaging surfaces of said first and second pulley units.

* * * * *